(12) United States Patent
Shiozaki et al.

(10) Patent No.: US 9,531,969 B2
(45) Date of Patent: Dec. 27, 2016

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Hiromi Shiozaki, Yokohama (JP); Atsushi Nogami, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/727,093

(22) Filed: Jun. 1, 2015

(65) Prior Publication Data
US 2015/0350579 A1 Dec. 3, 2015

(30) Foreign Application Priority Data

Jun. 2, 2014 (JP) ................................ 2014-114401

(51) Int. Cl.
| | |
|---|---|
| H04N 5/228 | (2006.01) |
| G06K 9/46 | (2006.01) |
| H04N 5/367 | (2011.01) |
| H04N 5/341 | (2011.01) |
| G06T 7/00 | (2006.01) |

(52) U.S. Cl.
CPC ........... *H04N 5/3675* (2013.01); *G06T 7/0081* (2013.01); *H04N 5/341* (2013.01); *G06T 2207/10028* (2013.01); *G06T 2207/20081* (2013.01); *G06T 2207/20144* (2013.01)

(58) Field of Classification Search
CPC ............ H04N 13/0011; H04N 13/0022; H04N 2013/0081; A63F 13/00; A63F 2300/66; A63F 2300/6692; G06T 15/20; G06T 15/205; G06T 15/405; G06T 15/503
USPC .......................................... 348/348; 382/190
See application file for complete search history.

(56) References Cited

U.S. PATENT DOCUMENTS

| | | | | |
|---|---|---|---|---|
| 2010/0302395 A1* | 12/2010 | Mathe | ................. | G06K 9/00342 348/222.1 |
| 2011/0069888 A1* | 3/2011 | Lim | .................... | G06K 9/00369 382/190 |
| 2012/0293402 A1* | 11/2012 | Harrison | ................. | G06F 3/017 345/156 |
| 2015/0092981 A1* | 4/2015 | Kim | ................... | G06K 9/00342 382/103 |

FOREIGN PATENT DOCUMENTS

JP 2011508325 A 3/2011

\* cited by examiner

*Primary Examiner* — Trung Diep
(74) *Attorney, Agent, or Firm* — Canon USA, Inc. IP Division

(57) ABSTRACT

An image processing apparatus includes an extraction unit, a setting unit, a reference value calculation unit, a comparison unit, and an information determination unit. The extraction unit extracts a target area from an image. The setting unit sets a pixel from the target area as a pixel-of-interest. The reference value calculation unit calculates a reference value based on a pixel value of at least one or more pixels included in the target area. The comparison unit repeatedly performs processing of comparing a pixel value of at least one or more pixels among a plurality of pixels in a predetermined layout with respect to the pixel-of-interest with the reference value. The information determination unit determines information of the pixel-of-interest based on a comparison result of the comparison unit and a value corresponding to the comparison result.

12 Claims, 8 Drawing Sheets

IMAGE PROCESSING APPARATUS, IMAGE PROCESSING METHOD, AND STORAGE MEDIUM

BACKGROUND OF THE INVENTION

Field of the Invention

The present invention relates to an image processing apparatus that performs processing on an image and an image processing method as well as a storage medium that stores a program for causing a computer to execute the image processing method.

Description of the Related Art

Technologies of an object recognition from an image, an object detection, an orientation estimation, and the like have been widely used up to now, and various proposals have been made. These technologies are realized while a characteristic amount is generally extracted from an image to perform an identification. PCT Japanese Translation Patent Publication No. 2011-508325 discloses a technology as one effective method in terms of both an accuracy and a speed among various methods for characteristic amount calculation and identification. PCT Japanese Translation Patent Publication No. 2011-508325 discloses that a combination of predetermined characteristic point pairs is extracted from an image, respective pixel values thereof are obtained, and the pixel values are compared with each other in the respective characteristic point pairs to generate a characteristic amount. In addition, PCT Japanese Translation Patent Publication No. 2011-508325 discloses that the object detection is performed with respect to this characteristic amount by using an identifier of a cascade structure or a tree-type structure.

According to the technology disclosed in PCT Japanese Translation Patent Publication No. 2011-508325 where the identification is performed by the comparison between the respective characteristic points, since only a variation between the characteristic points is used, noise is contained in the respective characteristic points in an image containing large noise, which may be a cause of an accuracy degradation in image processing.

SUMMARY OF THE INVENTION

The present invention has been made in view of the above-described issue and provides a mechanism for suppressing the accuracy degradation in the image processing even in the image containing the noise.

An image processing apparatus according to an aspect of the present invention includes an extraction unit configured to extract a target area from an image, a setting unit configured to set a pixel from the target area as a pixel-of-interest, a reference value calculation unit configured to calculate a reference value based on a pixel value of at least one or more pixels included in the target area, a comparison unit configured to repeatedly perform processing of comparing a pixel value of at least one or more pixels among a plurality of pixels in a predetermined layout with respect to the pixel-of-interest with the reference value, and an information determination unit configured to determine information of the pixel-of-interest based on a comparison result of the comparison unit and a value corresponding to the comparison result.

Further features of the present invention will become apparent from the following description of exemplary embodiments with reference to the attached drawings.

DESCRIPTION OF THE EMBODIMENTS

Hereinafter, modes (exemplary embodiments) for carrying out the present invention will be described with reference to the drawings. It is noted that, according to the exemplary embodiments of the present invention which will be described below, an example in which a human body area is applied as a target area for image processing in the present invention will be described, but the present invention is not limited to this.

First Exemplary Embodiment

First, a first exemplary embodiment of the present invention will be described.

According to the present exemplary embodiment, an example in which a depth image is obtained from a depth camera that picks up an image of a person, and this depth image is subjected to image processing to estimate an orientation of this person will be described. At this time, for each point (each pixel-of-interest) in a human body area of the depth image, a pixel value of a pixel (comparison target pixel) at a previously learnt layout is compared with a reference value calculated on the basis of a pixel value included in the human body area to obtain a relative relationship with a corresponding region by referring to a table created by learning in advance and estimate positions of the respective regions of the human body.

In the following descriptions of the exemplary embodiments, the estimation of the orientation of the person means that the positions of the respective regions of the human body are estimated. The respective regions may be parts constituting the human body, a portion of the parts, or a joint. At that time, the position of the region to be obtained may be not only two-dimensional but also three-dimensional.

Configuration

Figure 1:
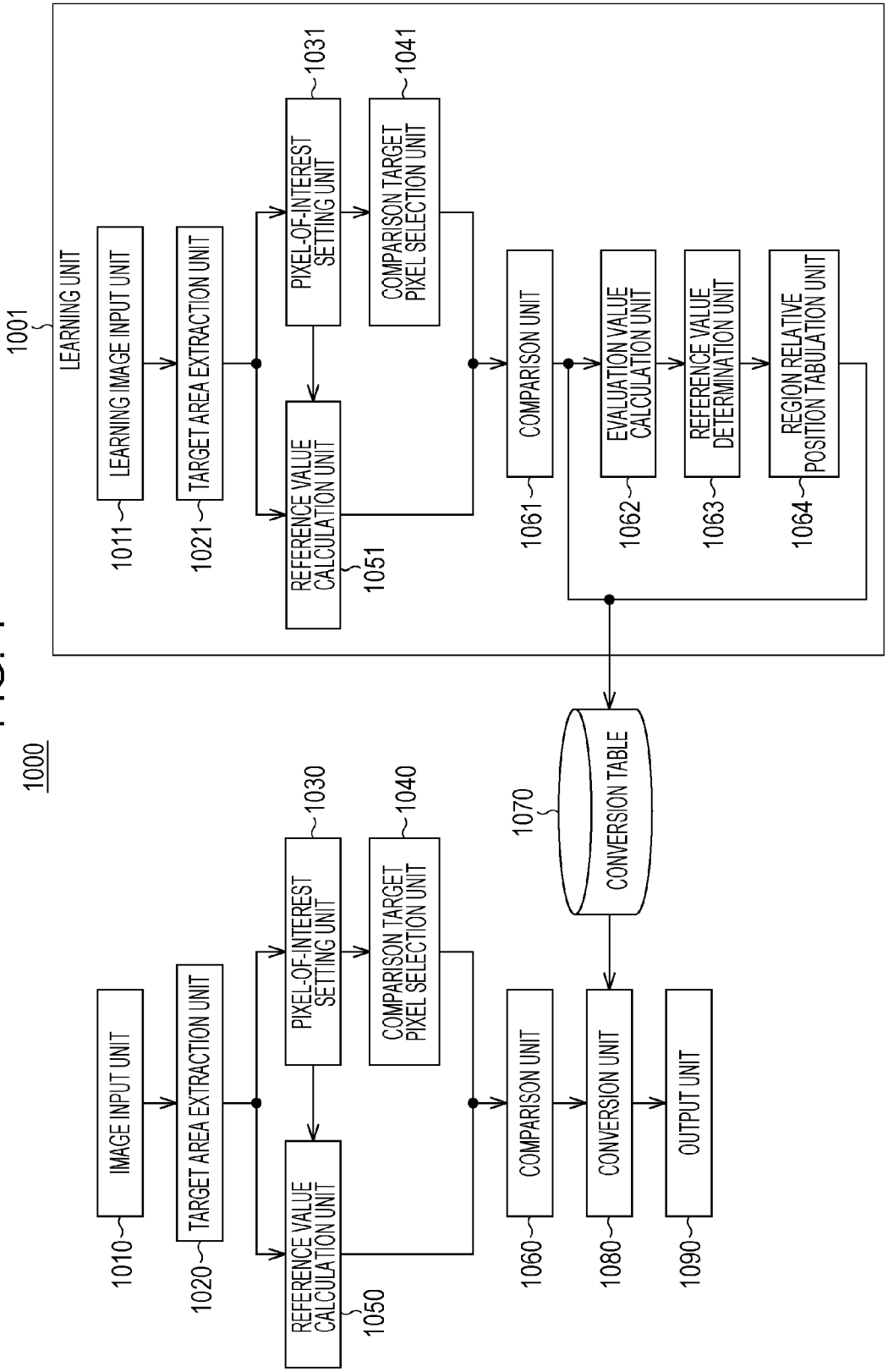
FIG. 1 illustrates an example of a schematic configuration of the image processing apparatus according to a first exemplary embodiment of the present invention.

FIG. 1 illustrates an example of a schematic configuration of an image processing apparatus according to the first exemplary embodiment of the present invention. As illustrated in FIG. 1, an image processing apparatus 1000 is constituted by including a learning unit 1001, an image input unit 1010, a target area extraction unit 1020, a pixel-of-interest setting unit 1030, a comparison target pixel selection unit 1040, a reference value calculation unit 1050, a comparison unit 1060, a conversion table 1070, a conversion unit 1080, and an output unit 1090. The learning unit 1001 is constituted by including a learning image input unit 1011, a target area extraction unit 1021, a pixel-of-interest setting unit 1031, a comparison target pixel selection unit 1041, a reference value calculation unit 1051, a comparison unit 1061, an evaluation value calculation unit 1062, a reference value determination unit 1063, and a region relative position tabulation unit 1064. It is noted that the image processing apparatus 1000 may adopt a configuration without the learning unit 1001, and in this case, for example, the learning unit 1001 is constituted by another image processing apparatus.

Specific processings in the respective components of the image processing apparatus 1000 illustrated in FIG. 1 will be described by using a flow chart in FIG. 2 and the like.

The image processing apparatus 1000 according to the exemplary embodiment of the present invention can be realized while software (program) obtained via a network or various recording media is executed by a calculator constituted by a CPU, a memory, a storage device, an input and output apparatus, a bus, a display apparatus, and the like. A general-use calculator or hardware appropriately designed by the software may be used as the calculator (not illustrated).

Detail of the Processing

Figure 2:
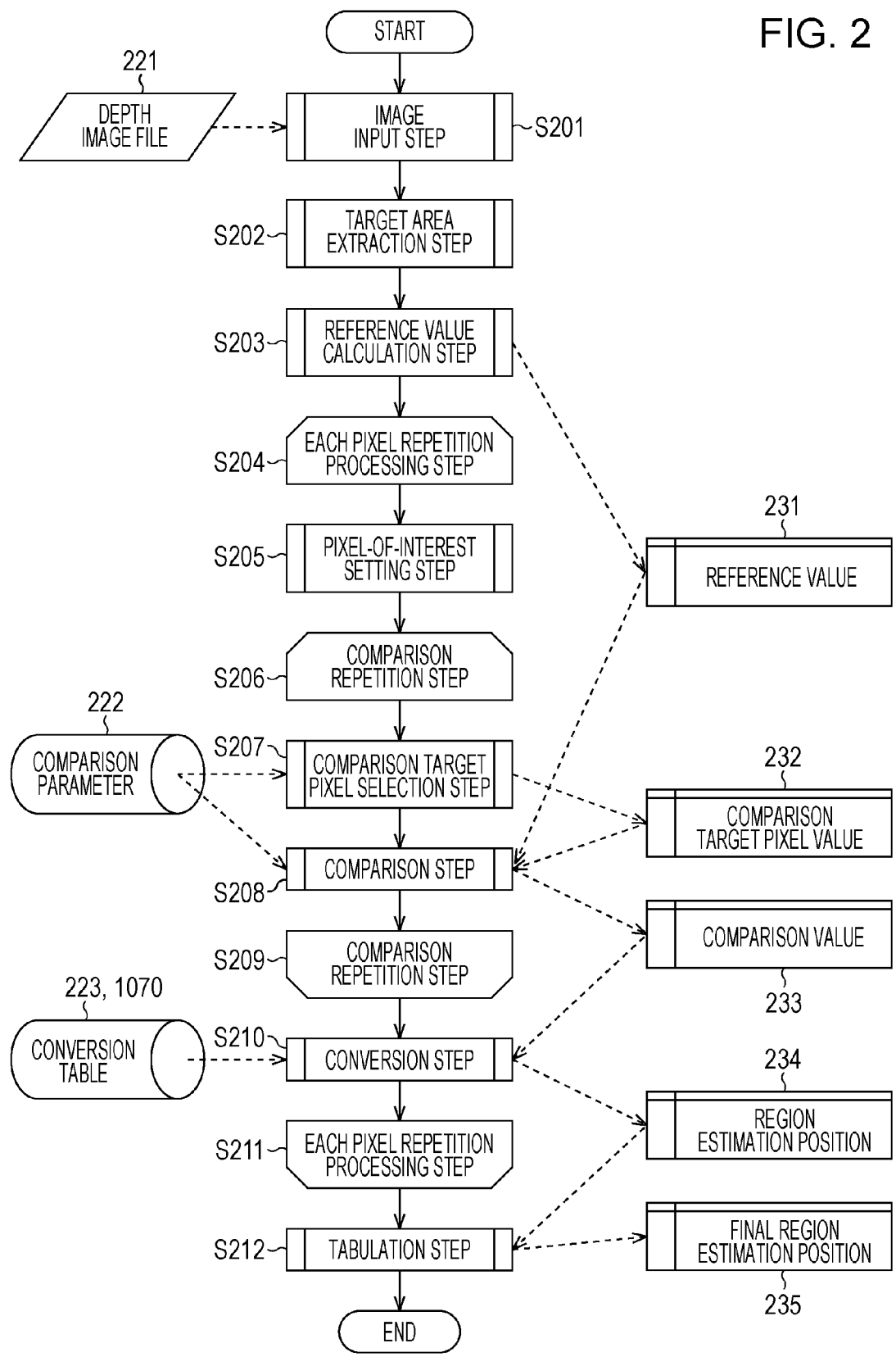
FIG. 2 is a flow chart illustrating an example of a processing procedure of an image processing method by the image processing apparatus according to the first exemplary embodiment of the present invention.

FIG. 2 is a flow chart illustrating an example of a processing procedure of an image processing method by an image processing apparatus according to the first exemplary embodiment of the present invention. Processing by the image processing apparatus 1000 according to the present exemplary embodiment will be described by using FIG. 1 and FIG. 2. Herein, FIG. 2 illustrates processing in a case where the orientation of the person is estimated.

In step S201 in FIG. 2, the image input unit 1010 in FIG. 1 performs an input of a depth image. Herein, the depth image refers to an image in which distance information in a depth direction is recorded as a pixel value in a predetermined scaling for each of the pixels in the image. This depth image may be obtained and input from the above-described depth camera, or may be input by reading a depth image file 221 previously picked up and saved. Specifically, the image input unit 1010 in FIG. 1 inputs the obtained depth image to the target area extraction unit 1020. The learning image input unit 1011 of the learning unit 1001 in FIG. 1 also performs the processing similar to that performed by the image input unit 1010, but a learning image previously prepared for learning is used as the input image.

Subsequently, in step S202 in FIG. 2, the target area extraction unit 1020 in FIG. 1 extracts a target area for the image processing from the depth image input in step S201. According to the present exemplary embodiment, a case where the target area is the human body area will be described.

In the extraction processing of the human body area, first, the target area extraction unit 1020 in FIG. 1 performs background difference processing on the depth image to extract a foreground candidate pixel, that is, a human body herein.

Although this can be used as it is, in a case where the foreground candidate pixel is to be more accurately extracted, the target area extraction unit 1020 in FIG. 1 subsequently converts a depth value of the foreground candidate pixel into a point group of a camera coordinate system (three-dimensional coordinate system). The target area extraction unit 1020 in FIG. 1 then obtains a gravity center position of a mass of the three-dimensional point group and sets points existing in a range fit into a human body size in the point group at the periphery of the gravity center position as the human body area. At this time, the human body size can be determined by using a previously learnt average size of the human bodies, a maximum size, or the like. With regard to a contact part with a floor, a plane estimation or the like is performed to determine a boundary between the floor and the human body, and it is possible to determine the human body area. The target area extraction unit 1020 in FIG. 1 then projects only the point group labelled as the human body area onto an image plane again, and the depth image where the human body area is extracted can be obtained.

It is noted that the extraction method for the human body area is not limited to this mode, and a related art method may also be employed. The target area extraction unit 1020 in FIG. 1 then transmits the depth image of the extracted human body area part to the reference value calculation unit 1050 and the pixel-of-interest setting unit 1030. The target area extraction unit 1021 of the learning unit 1001 in FIG. 1 has the processing target similar to that of the target area extraction unit 1020 although the images of the processing target are different from each other.

Subsequently, in step S203 in FIG. 2, the reference value calculation unit 1050 in FIG. 1 calculates a reference value 231 on the basis of a pixel value of the pixel included in the depth image of the human body area part corresponding to the target area extracted in step S202. For example, the reference value calculation unit 1050 in FIG. 1 calculates an average value as the reference value 231 from the pixel values (depth values) of the pixels included in the depth image of the human body area part. Herein, the descriptions will be given while this average value is used as the reference value 231, but the reference value 231 may be any value as long as the value can be used as the reference calculated from the pixel value of the pixel included in the depth image of the human body area part. Other than the average value, for example, a median value, a representative value, or the like can also be used. Furthermore, a histogram of the pixel values (depth values) of the pixel included in the depth image of the human body area part may be generated, and the reference value 231 may be randomly determined from the pixel values having a higher frequency, for example.

In the calculation for the reference value 231, the pixel values (depth values) of the pixels included in the depth image of the human body area part extracted in step S202 do not necessarily need to be used. For example, in the depth image of the human body area part extracted in step S202, the reference value 231 may be calculated by using pixel values of some pixels picked up at a rate of only one pixel out of several pixels, or some proportion of the entire pixels may be sampled, and the reference value 231 may be calculated by using the pixel values of the sampled pixels.

It is noted that the calculation method for the reference value 231 is not limited to the above-described methods.

The reference value 231 is common within one image but differs among images and plays a role of correction among the images. Furthermore, even in an image containing much noise, the reference value 231 is generated from the entire human body area, and the influence of the noise can be reduced. The reference value calculation unit 1050 in FIG. 1 then transmits the calculated reference value 231 to the comparison unit 1060. The reference value calculation unit 1051 of the learning unit 1001 in FIG. 1 has the processing target similar to that of the reference value calculation unit 1050 although the images of the processing target are different from each other.

In the subsequent steps S204 to S211 in FIG. 2, the repetition processing is performed for each pixel-of-interest set in step S205 in FIG. 2.

In step S205 of FIG. 2, the pixel-of-interest setting unit 1030 in FIG. 1 sets a certain pixel from the depth image of the human body area part corresponding to the target area extracted in step S202 as the pixel-of-interest. In this setting processing, a certain pixel is sequentially selected from the depth image of the human body area part to be sequentially set as the pixel-of-interest. Herein, the descriptions have been made that the certain pixel is sequentially selected from the depth image of the human body area part, but all the pixels of the human body area part do not necessarily need to be selected. The pixels may be selected at intervals of one in several pixels, or a certain part may be selected in clusters. In addition, the pixel is set as a selection unit, but not only one pixel but also a group of several pixels or the like may also be set as the selection unit. Descriptions will be given by using FIGS. 3A to 3C.

Figure 3A:
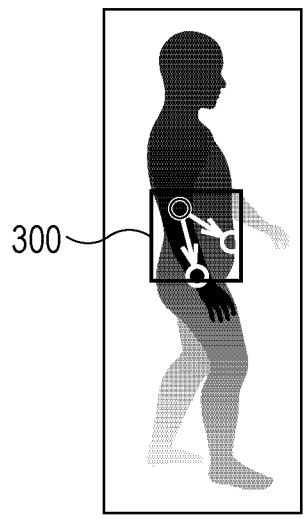
FIGS. 3A to 3C are explanatory diagrams for describing processings in a pixel-of-interest setting unit, a comparison target pixel selection unit, and a comparison unit in FIG. 1 according to the first exemplary embodiment of the present invention.
Figure 3B:
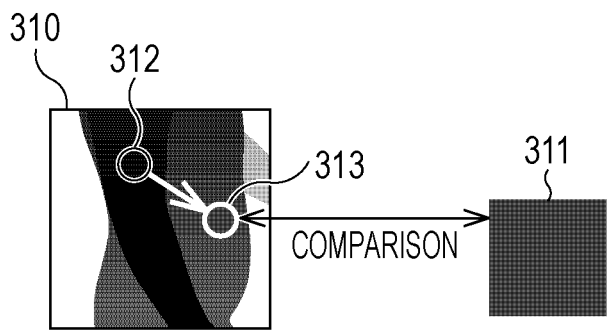
Figure 3C:
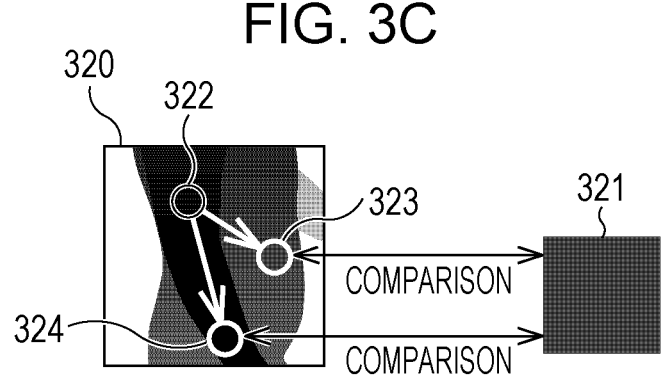

FIGS. 3A to 3C are explanatory diagrams for describing processings in the pixel-of-interest setting unit 1030 in FIG. 1, the comparison target pixel selection unit 1040, and the comparison unit 1060 according to the first exemplary embodiment of the present invention.

FIG. 3A illustrates the human body area part, and a part 300 corresponds to a certain part of the human body area part.

A part 310 in FIG. 3B is an expanded view of the part 300 illustrated in FIG. 3A and illustrates a state in which a certain pixel is set as the pixel-of-interest 312. Herein, information of the set pixel-of-interest 312 is transmitted to the comparison target pixel selection unit 1040. FIG. 3B illustrates information related to a reference value 311 equivalent to the reference value 231 calculated by the reference value calculation unit 1050.

With regard to the pixel-of-interest setting unit 1031 of the learning unit 1001 in FIG. 1, although the images of the processing target are different from each other, the processing content for setting the pixel-of-interest is similar to that of the pixel-of-interest setting unit 1030. It is noted that, at the time of the learning, a large number of images such as orientations with multiple variations and orientations including a minute movement change are used in many cases. For that reason, in a case where a sufficient memory capacity is not secured, all the pixels of the human body area part do not necessarily need to be set as the pixel-of-interest.

In the subsequent steps S206 to S209 in FIG. 2, the repetition processing is performed for each comparison target pixel selected in step S207 in FIG. 2.

In step S207 in FIG. 2, the comparison target pixel selection unit 1040 in FIG. 1 selects the pixel in the layout learnt from the pixel-of-interest set in step S205 as the comparison target pixel. Specifically, the comparison target pixel selection unit 1040 selects the comparison target pixel by using a comparison parameter 222 on the basis of the pixel-of-interest set in step S205. In the comparison parameter 222, a layout relationship between the pixel-of-interest and the comparison target pixel used at the time of the learning is saved. According to the present exemplary embodiment, as illustrated in FIG. 3B, a comparison target pixel 313 corresponding to the currently set pixel-of-interest 312 is selected and determined by utilizing the comparison parameter 222. The comparison target pixel selection unit 1040 in FIG. 1 then obtains a comparison target pixel value 232 corresponding to a pixel value of the selected comparison target pixel 313.

In FIG. 3B, the descriptions have been given while the number of the comparison target pixels 313 is set as 1. However, the number of the comparison target pixels is not limited. For example, as illustrated in FIG. 3C, a mode may be adopted in which as a plurality of comparison target pixels 323 and 324 may be selected as the comparison target pixels corresponding to the set pixels-of-interest 322. It is noted that, in FIG. 3C, a part 320 is an expanded view of the part 300 illustrated in FIG. 3A and illustrates a state in which a certain pixel is set as the pixel-of-interest 322. FIG. 3C also illustrates information related to a reference value 321 equivalent to the reference value 231 calculated by the reference value calculation unit 1050.

This processing is repeatedly performed by a predetermined number of times in the comparison repetition steps S206 to S209, and the comparison is performed numeral times with respect to the certain fixed pixel-of-interest. The comparison target pixel value 232 obtained as the result of the processing in step S207 is transmitted to the comparison unit 1060. It is noted that a method of determining the comparison parameter in the comparison target pixel selection unit 1041 of the learning unit 1001 will be described after descriptions will be given of the comparison unit.

Subsequently, in step S208 in FIG. 2, the comparison unit 1060 in FIG. 1 performs processing of comparing the pixel value (the comparison target pixel value 232) of the comparison target pixel corresponding to the pixel in the layout learnt from the pixel-of-interest with the reference value (the reference value 231) calculated by the reference value calculation unit 1050. When the descriptions are based on FIG. 3B, the pixel value of the comparison target pixel 313 is compared with the reference value 311. In a case where the plurality of comparison target pixels are used, as in FIG. 3C, the comparison unit 1060 in FIG. 1 compares the pixel value of each of the comparison target pixels 323 and 324 with the reference value 321.

Specifically, for example, as in FIG. 3B, in a case where the single comparison target pixel is used, when the comparison target pixel value 232 is set as $d_1$, the reference value 231 is set as $d_u$, and a threshold is set as $th_1$, the comparison unit 1060 performs the comparison by performing a true/false judgment based on the following Expression (1).

$$d_1 - d_u > th_1$$

In Expression (1), if the threshold $th_1$ is 0, it simply means a magnitude relationship with the reference value. For example, when Expression (1) is true, the comparison unit 1060 sets a comparison value 233 as 1, and when Expression (1) is false, the comparison unit 1060 sets the comparison value 233 as 0. It is noted that, herein, the comparison value 233 is set to be binary but does not necessarily need to be binary. For example, a range can also be divided by using a conditional expression $H_{21}$ in the following Expression (2), a conditional expression $H_{22}$ in the following Expression (3), and a conditional expression $H_{23}$ in the following Expression (4). At this time, $th_{11}$ and $th_{12}$ denote thresholds.

$$H_{21}: d_1 - d_u < th_{11} \tag{2}$$

$$H_{22}: n_{11} \leq d_1 - d_u < th_{12} \tag{3}$$

$$H_{23}: d_1 - d_u > th_{12} \tag{4}$$

For example, a configuration may be adopted in which, when the conditional expression $H_{21}$ in Expression (2) is satisfied, the comparison value 233 is set as 0, when the conditional expression $H_{22}$ in Expression (3) is satisfied, the comparison value 233 is set as 1, and when the conditional expression $H_{23}$ in Expression (4) is satisfied, the comparison value 233 is set as 2.

In the above-described Expression (1) and the like, subtraction is simply performed to carry out the comparison, but a standard deviation σ of the pixel values (depth values) of the human body area part may be previously calculated, and normalization may be performed by the standard deviation as illustrated in the following Expression (5).

$$\frac{d_1 - d_u}{\sigma} > th_1 \tag{5}$$

Of course, according to the present exemplary embodiment, the configuration is not limited to the standard deviation illustrated in Expression (5). For example, the normalization may be performed by a size of a range which a value may take such as a lowest value and a highest value. Furthermore, for example, it is also conceivable to employ a method of creating a histogram by the pixel values (depth values) of the human body area part and performing the normalization in a range where x % of the entirety exist, or the like.

Next, a case where the plurality of comparison target pixels as illustrated in FIG. 3C exist will be described.

In FIG. 3C, a pixel value of the comparison target pixel 323 is set as $d_1$, a pixel value of the comparison target pixel 324 is set as $d_2$, the reference value 321 is set as $d_u$, and thresholds are set as $th_1$ and $th_2$, the comparison unit 1060 performs the comparison by performing a true/false judgment on a conditional expression $H_{31}$ in the following Expression (6) and a conditional expression $H_{32}$ in the following Expression (7).

$$H_{31}: d_1 - d_u > th_1 \tag{6}$$

$$H_{32}: d_2 - d_u > th_2 \tag{7}$$

The comparison unit 1060 sets, for example, the comparison value 233 as 1 when the conditional expression $H_{31}$ in Expression (6) and the conditional expression $H_{32}$ in Expression (7) are both true or both false, and set the comparison value 233 as 0 when one of the conditional expressions is true, and the other conditional expression is false. It is noted that, herein, the comparison value 233 is set to be binary but does not necessarily need to be binary. The plurality of comparison target pixels are used, and the number of conditional expressions is also increased. Thus, since a more complex comparison, that is, a comparison having much information amount can be performed, it is possible to expect an improvement in the accuracy of the image processing as compared with the case where the single comparison target pixel is used or the number of conditional expressions is low.

It is noted that the same thresholds as those at the time of the learning are used as the thresholds $th_1$ and $th_2$ used herein. In addition, in the above-described Expression (6) and Expression (7), subtraction is simply performed to carry out the comparison, but the standard deviation σ of the pixel values (depth values) of the human body area part may be previously calculated, and similarly as in the above-described Expression (5), the normalization may be performed by the standard deviation as illustrated in the following Expression (8) and Expression (9).

$$\frac{d_1 - d_u}{\sigma} > th_1 \tag{8}$$

$$\frac{d_2 - d_u}{\sigma} > th_2 \tag{9}$$

Of course, according to the present exemplary embodiment, similarly as in the case where the single comparison target pixel is used, the configuration is not limited to the standard deviation illustrated in Expression (8) and Expression (9).

In this manner, the comparison unit 1060 combines the result of the comparison between the comparison target pixel value 232 and the reference value 231 with the result of the comparison between this result of the comparison and the learnt corresponding threshold to calculate the comparison value used when the information of the pixel-of-interest is determined in the conversion unit 1080. The comparison unit 1060 then transmits the comparison value 233 calculated in this manner to the conversion unit 1080.

Herein, the method of determining the comparison parameter of the comparison target pixel selection unit 1041 of the learning unit 1001 in FIG. 1 and the method of determining the threshold of the comparison unit 1061 will be described.

First, a method of randomly determining both the comparison parameter and the threshold is conceivable as a simple method. For example, the method of determining the comparison parameter includes randomly determining a direction and a distance while the pixel-of-interest is set as a reference. Accordingly, the layout is determined. The threshold of the comparison unit 1061 is also randomly determined in a certain range. Of course, it is also possible to adopt a configuration in which a probability to be selected is set in a range that may be selected, and in accordance with the probability, the threshold is selected at a high probability from the layout desired to be selected with priority or the range of the value. Furthermore, a method of using an evaluation index that will be described below according to the fourth exemplary embodiment is also conceivable.

Subsequently, the comparison repetition steps S206 to S209 in FIG. 2 will be further described. In a case where a discrete comparison value is calculated by the comparison units 1060 and 1061, an identification method such as "tree" or "Fern" can be employed.

Herein, descriptions will be given by using tree.

In this case, processings in respective nodes of tree are equivalent to steps S207 and S208. That is, in this case, a layout relationship between the pixel-of-interest used at the time of the learning at a certain node and the comparison target pixel is stored in the comparison parameter 222. For example, in a case where the comparison target pixel exists at a position in a direction θ at a distance x from a certain pixel-of-interest, the direction θ and the distance x are stored as the comparison parameter 222. The stored comparison parameter 222 is then used with respect to the pixel-ofinterest set at the time of the identification to calculate the position of the comparison target pixel and obtain a pixel value thereof.

Subsequently, the comparison unit compares this pixel value with the reference value to calculate a comparison value. Subsequently, for example, when the comparison value is 1, a path tracks a child node on the right, and when the comparison value is 0, the path tracks a child node on the left. When the path shifts to the child node, the same processing is performed, and the processing is repeated until the path reaches a leaf of tree. Herein, the bifurcate case has been described, but the number of branches may be much more.

While the comparison between the pixels (comparison target pixels) at the periphery of the pixel-of-interest and the reference value is repeatedly performed with respect to the certain pixel-of-interest in the above-described manner, the variations at the periphery of the pixel-of-interest can be indirectly compared with each other, and it is therefore possible to realize the local shape comparison. Furthermore, the magnitude relationship with the common reference value in the entire human body area can be compared, and it is also possible to find out the relationship with respect to the entire human body area.

When the processing of the comparison repetition steps in steps S206 to S209 in FIG. 2 is ended, the flow proceeds to step S210 in FIG. 2.

When the flow proceeds to step S210 in FIG. 2, the conversion unit 1080 in FIG. 1 performs processing of referring to the previously learnt corresponding value of the conversion table 1070 (223) on the basis of the result of the repeated comparison with respect to the pixel (comparison target pixel) at the different learnt layout in the comparison unit 1060 and determining information of the pixel-of-interest set in step S205. The conversion unit 1080 that performs the processing of determining the information of this pixel-of-interest constitutes an information determination unit.

Specifically, according to the present exemplary embodiment, first, the conversion unit 1080 refers to the conversion table 1070 (223) and obtains a relative region coordinate value corresponding to the comparison value 233, that is, the tracked leaf of tree. In a case where the orientation estimation of the person is performed as in the present exemplary embodiment, the conversion unit 1080 performs the estimation of the region coordinates. The conversion unit 1080 then determines a region estimation position 234 of the pixel-of-interest from the pixel value (depth value) of the pixel-of-interest and the obtained relative region coordinate value and performs an estimation of a region. For example, specifically, the conversion unit 1080 obtains a coordinate value from the pixel value (depth value) of the pixel-of-interest and a cameral parameter (such as a focal length) to be matched with the relative region coordinate value to determine the region estimation position 234 of the pixel-of-interest.

Subsequently, the conversion table 1070 (223) will be described.

The conversion table 1070 (223) is created in advance by utilizing the learning depth image corresponding to the learning image in the learning unit 1001. The processing is performed also in the learning unit 1001 in accordance with the above-described procedure. That is, the pixel-of-interest setting unit 1031 selects a certain pixel from the learning depth image of the human body area part to be set as the pixel-of-interest. Subsequently, the positional relation between this pixel-of-interest and the human body region is calculated.

Subsequently, classification is performed by using the identifier similar to that in the descriptions at the time of the estimation, that is, tree herein. Specifically, the comparison target pixel selection unit 1041 selects the comparison target pixel at each node. The positional relationship between the comparison target pixel selected at this time and the pixel-of-interest is stored as the comparison parameter 222. Thereafter, the comparison unit 1061 compares the comparison target pixel value obtained by the comparison target pixel selection unit 1041 with the reference value calculated by the reference value calculation unit 1051 and further compares the comparison target pixel value with the threshold to calculate the comparison value. The comparison unit 1061 then performs branching at each node by this comparison value, and the same processing is repeated in the child node. Subsequently, the positional relationship between the pixel-of-interest calculated for the first time and the human body region is stored in the tracked leaf, that is, the comparison value as the relative region coordinate value. This processing is performed in an arbitrary pixel in an arbitrary image area in the learning depth image. The relative region coordinate value of the thus created information of the leaf, that is, the comparison value, and the human body region at that time is set as the conversion table 1070 (223).

It is noted that, since the same number of pairs of the comparison values as the number of nodes are obtained when the path reaches the leaf in this example, the pairs of the comparison values are used as the conversion table 1070 (223). In addition, herein, the positional relationship with the human body region is stored in the leaf. However, the stored information is not limited to this, and information of a pixel in the vicinity of which region or the like may be stored, for example. Furthermore, this configuration has been represented as the conversion table 1070 (223) but does not necessarily need to be a table in actuality as long as the association between the comparison value and the used information, herein, the human body region and the relative region coordinate value, is established.

When the processing in steps S201 to S211 in FIG. 2 described above is performed, each time the pixel-of-interest is set, the region estimation position 234 is calculated to perform the estimation of the human body region. For that reason, after the end of each pixel repetition processing steps in steps S204 to S211 in FIG. 2, the output unit 1090 in FIG. 1 (or the conversion unit 1080 in FIG. 1) tabulates the region estimation position 234 calculated for each pixel-of-interest to calculate a final region estimation position 235 as the entire human body area corresponding to the target area in step S212 in FIG. 2. For example, the final region estimation position 235 may be simply calculated by the average value for each of the estimated respective regions, or an weighted average may be calculated by weighting the respective estimations. Furthermore, the calculation may be performed by using a technique such as "meanshift".

Figure 5:
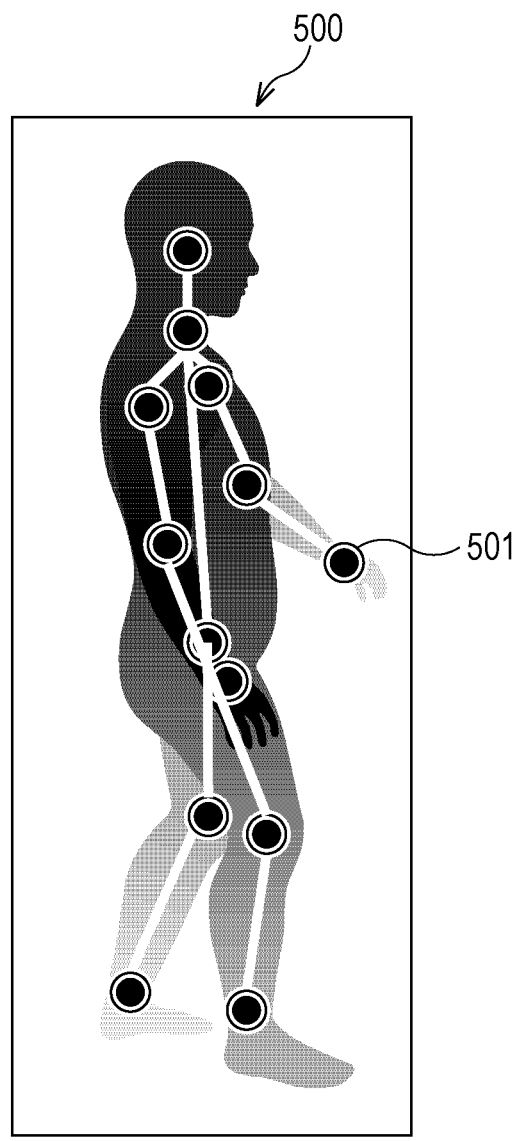
FIG. 5 illustrates an example of an output mode of a final region estimation position according to the first exemplary embodiment of the present invention.

Thereafter, the output unit 1090 in FIG. 1 outputs the final region estimation position 235. As a method of the output, the coordinates of the region may be output to the file, or a display as illustrated in FIG. 5 may be performed. Herein, FIG. 5 illustrates an example of the output mode of the final region estimation position according to the first exemplary embodiment of the present invention. Specifically, in FIG. 5, respective region positions 501 related to the respective final region estimation positions 235 are overlapped on the depth image 500 and displayed.

According to the present exemplary embodiment, the example in which the depth image is used has been described, but an RGB image may also be used, for example. If an RGB stereo image is used, the same processing as the above-described processing can be performed while only the input images are different from each other. Herein, a case where a human body area is extracted from a single RGB image to be set as a binary image will be considered. In this case, at the time of the comparison, the accuracy is decreased as compared with the time when the depth image is used since the comparison of only the inside or outside of the human body area is performed, but the estimation can be performed.

Furthermore, according to the present exemplary embodiment, the example in which the orientation of the person is estimated has been described, but the technique can be also used as the method for the identification and the conversion of the image such as the object recognition and the object detection. In this case, by changing the information held by the conversion table 1070, the technique can be used for usages other than the orientation estimation. Furthermore, the conversion unit 1080 performs the conversion in accordance with the information referred to in the conversion table 1070, and the information calculated and determined by the conversion unit 1080 is output by the output unit 1090.

For example, in a case where the exemplary embodiment is applied to the object recognition, information as to which object, and furthermore, information as to which region of which object may be held in the conversion table 1070. As a result, which object, and furthermore, which region of which object can be calculated to be output.

In addition, for example, in a case where the exemplary embodiment is applied to the object detection, it is conceivable that the conversion table 1070 may hold information as to whether or not this is an object, information on a center position of the object, and the like. As a result, whether or not the object is detected can be calculated, and furthermore, its position in a case where the object is detected can be calculated to be output.

It is noted that the exemplary embodiment of the present invention can be not only the usages described herein but also various usages.

According to the present exemplary embodiment, the reference value is calculated on the basis of the pixel value of the pixel included in the target area, and the pixel value of the pixel in the layout learnt from the pixel-of-interest and this reference value are compared with each other, so that it is possible to reduce the factors in which the noise is contained at the time of the comparison. Accordingly, it is possible to suppress the accuracy degradation in the image processing even in the image containing the noise.

Since the variations at the periphery of the pixel-of-interest can be indirectly compared with each other by repeatedly performing this comparison, for example, the local shape comparison can be realized.

Second Exemplary Embodiment

Next, a second exemplary embodiment of the present invention will be described.

According to the present exemplary embodiment, a case where a plurality of reference values are used in the same image will be described. That is, similarly as in the first exemplary embodiment, in the example in which the orientation of the person is estimated, the same reference value is not used as the used reference value in the entire human body area. The human body area is divided into a plurality of partial areas (for example, an upper part, a central part, and a lower part), and different reference values in each partial area are used, for example.

A schematic configuration of the image processing apparatus according to the second exemplary embodiment is similar to the schematic configuration of the image processing apparatus 1000 according to the first exemplary embodiment illustrated in FIG. 1. In addition, a processing procedure of the image processing method by the image processing apparatus 1000 according to the second exemplary embodiment is similar to the flow chart illustrating the processing procedure of the image processing method by the image processing apparatus 1000 according to the first exemplary embodiment illustrated in FIG. 2. Hereinafter, in the processing of the flow chart illustrated in FIG. 2, only a part different from the processing content according to the first exemplary embodiment will be described.

Detail of the Processing

In step S203 in FIG. 2, the reference value calculation unit 1050 in FIG. 1 calculates the reference value 231 on the basis of the pixel value of the pixel included in the depth image of the human body area part corresponding to the target area extracted in step S202. As being different from the first exemplary embodiment, according to the present exemplary embodiment, the plurality of reference values exist. This example will be described by using FIGS. 4A to 4C.

Figure 4A:
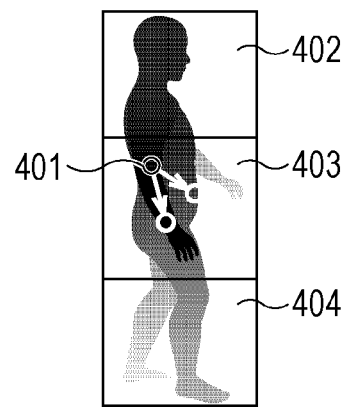
FIGS. 4A to 4C are explanatory diagrams for describing a method of calculating a reference value to be used according to a second exemplary embodiment and a third exemplary embodiment of the present invention.
Figure 4B:
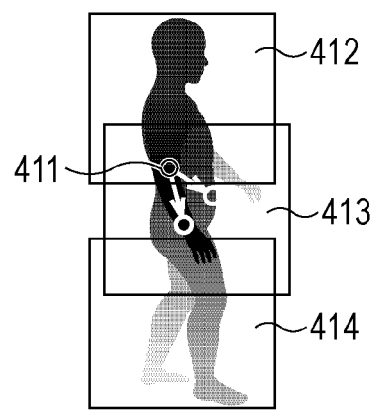
Figure 4C:
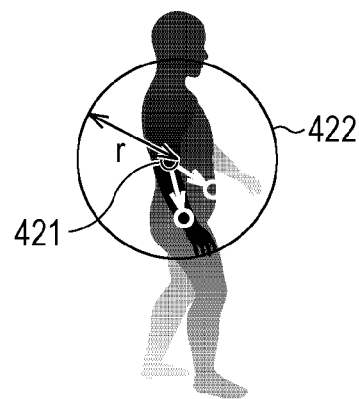

FIGS. 4A to 4C are explanatory diagrams for describing a calculation method for the reference value to be used according to the second exemplary embodiment and the third exemplary embodiment of the present invention.

In the present step, for example, the human body area extracted in step S202 is divided by three from the top as illustrated in FIG. 4A, and the respective divided partial areas are set as a human body area upper part 402, a human body area central part 403, and a human body area lower part 404. The reference value calculation unit 1050 in FIG. 1 then calculates an average value from the pixel values (depth values) of the pixels of the human body area parts included in the respective partial areas as the reference values 231 of the respective partial areas. In the case of the present example, three types of the reference values 231 related to the number of divided partial areas are fixed in the same image, but the reference values 231 differ among the images and play the role of the correction among the images. With the plurality of reference values 231, it is possible to realize the partial positional correction as compared with a case where one reference value is used in one image, and it is possible to expect the accuracy increase in the partial area.

Herein, the case where this average value is used as the reference value 231 has been described, but any value may be used as the reference value 231 as long as the value functions as the reference calculated from the pixel values of the pixels of the human body area parts included in the respective partial areas, and in addition to the average value, for example, a median value, a representative value, or the like can also be used. Furthermore, a histogram of the pixel values (depth values) of the pixels of the human body area parts included in the respective partial areas may be generated, and the reference value 231 may be randomly determined from the pixel values having a higher frequency, for example. In the calculation for the reference value 231, the pixel values (depth values) of all the pixels of the human body area parts included in the respective partial areas do not necessarily need to be used. For example, the reference value 231 may be calculated by using pixel values of some pixels picked up at a rate of only one pixel out of several pixels in the human body area parts included in the respective partial areas, or some proportion of the human body area parts included in the respective partial areas may be sampled, and the reference value 231 may be calculated by using the pixel values of the sampled pixels.

Herein, the human body area is divided by three from the top, but the dividing method is not limited to this. The human body area does not necessarily need to be divided from the top or equally divided. The human body area may be divided into two or four. Furthermore, instead of neatly dividing the human body area, partial areas may be created such that the partial areas are set to have overlapped areas as illustrated in FIG. 4B. While the partial areas are set to have the overlapped areas, the tendency that the estimation results are changed can be suppressed, and it is possible to expect the effect of avoiding the decrease in the accuracy. The reference value calculation unit 1051 of the learning unit 1001 in FIG. 1 also performs the processing similar to that performed by the reference value calculation unit 1050 described above. The reference value calculation units 1050 and 1051 respectively transmit the calculated reference values to the comparison units 1060 and 1061.

In step S208 in FIG. 2, the comparison unit 1060 in FIG. 1 performs processing of comparing the pixel value of the comparison target pixel corresponding to the pixel in the layout learnt from the pixel-of-interest (the comparison target pixel value 232) with the reference value calculated by the reference value calculation unit 1050 (the reference value 231). At this time, descriptions will be given of how to determine the reference value 231 to be used by using FIGS. 4A to 4C.

In step S205 in FIG. 2, it is assumed that the pixel-of-interest setting unit 1030 in FIG. 1 sets the pixel-of-interest 401 illustrated in FIG. 4A. At this time, the pixel-of-interest 401 belongs to the human body area central part 403. Thus, in this case, the comparison unit 1060 in FIG. 1 uses the reference value 231 calculated from the human body area central part as the reference value used for the comparison. The comparison method by the comparison unit 1060 in this case is similar to that according to the first exemplary embodiment described above. The comparison unit 1061 of the learning unit 1001 also similarly uses the reference value of the partial area to which the pixel-of-interest belongs.

Subsequently, a method of performing a setting such that the partial areas have the overlapped areas at the time of the learning as illustrated in FIG. 4B and using the reference value belonging to one of the partial areas at the time of the orientation estimation of the person will be described.

That is, in this case, it is assumed that the pixel-of-interest setting unit 1031 of the learning unit 1001 sets the pixel-of-interest 411 illustrated in FIG. 4B. At this time, the pixel-of-interest 411 belongs to both a human body area upper part 412 and a human body area central part 413. Thus, a comparison is performed by using both the reference value calculated from the human body area upper part 412 and the reference value calculated from the human body area central part 413. That is, the learning is conducted in a manner that the pixel-of-interest 411 described above is regarded as two separate samples including a pixel belonging to the human body area upper part 412 and a pixel belonging to the human body area central part 413. The comparison method is similar to that according to the first exemplary embodiment described above.

At the time of the orientation estimation of the person, the pixel-of-interest 411 is set to be allocated to one of the partial areas. For example, center positions of the respective partial areas and distances are calculated, and the human body area central part 413 is selected as the part belonging to the closest partial area in the case illustrated in FIG. 4B, for example. Thus, in this case, the comparison unit 1060 in FIG. 1 performs the comparison by using the reference value of the human body area central part 413. Furthermore, not only at the time of the learning but also at the time of the orientation estimation of the person, as illustrated in FIG. 4B, it is possible to perform the setting such that the partial areas have the overlapped areas. In this case, similarly as in the above-described example, the pixel-of-interest 411 belongs to both the human body area upper part 412 and the human body area central part 413. In view of the above, the comparison unit 1060 in FIG. 1 calculates, for example, an average value of the reference value calculated from the human body area upper part 412 and the reference value calculated from the human body area central part 413 and uses this average value as the reference value 231. The comparison method by the comparison unit 1060 in this case is similar to that according to the first exemplary embodiment described above.

It is noted that the manner to shape the partial areas and the method of using the reference value may adopt various modes and are not limited to those described herein.

Third Exemplary Embodiment

Next, a third exemplary embodiment of the present invention will be described.

According to the present exemplary embodiment, as being different from the above-described first and second exemplary embodiments, a case where the reference value are varied for each pixel-of-interest will be described. That is, in the example in which the orientation of the person is estimated similarly as in the first exemplary embodiment, instead of using the same reference value for the entire human body area as the reference value to be used, the reference value is calculated and used each time the pixel-of-interest is set.

A schematic configuration of the image processing apparatus according to the third exemplary embodiment is similar to the schematic configuration of the image processing apparatus 1000 according to the first exemplary embodiment illustrated in FIG. 1.

Detail of the Processing

Figure 6:
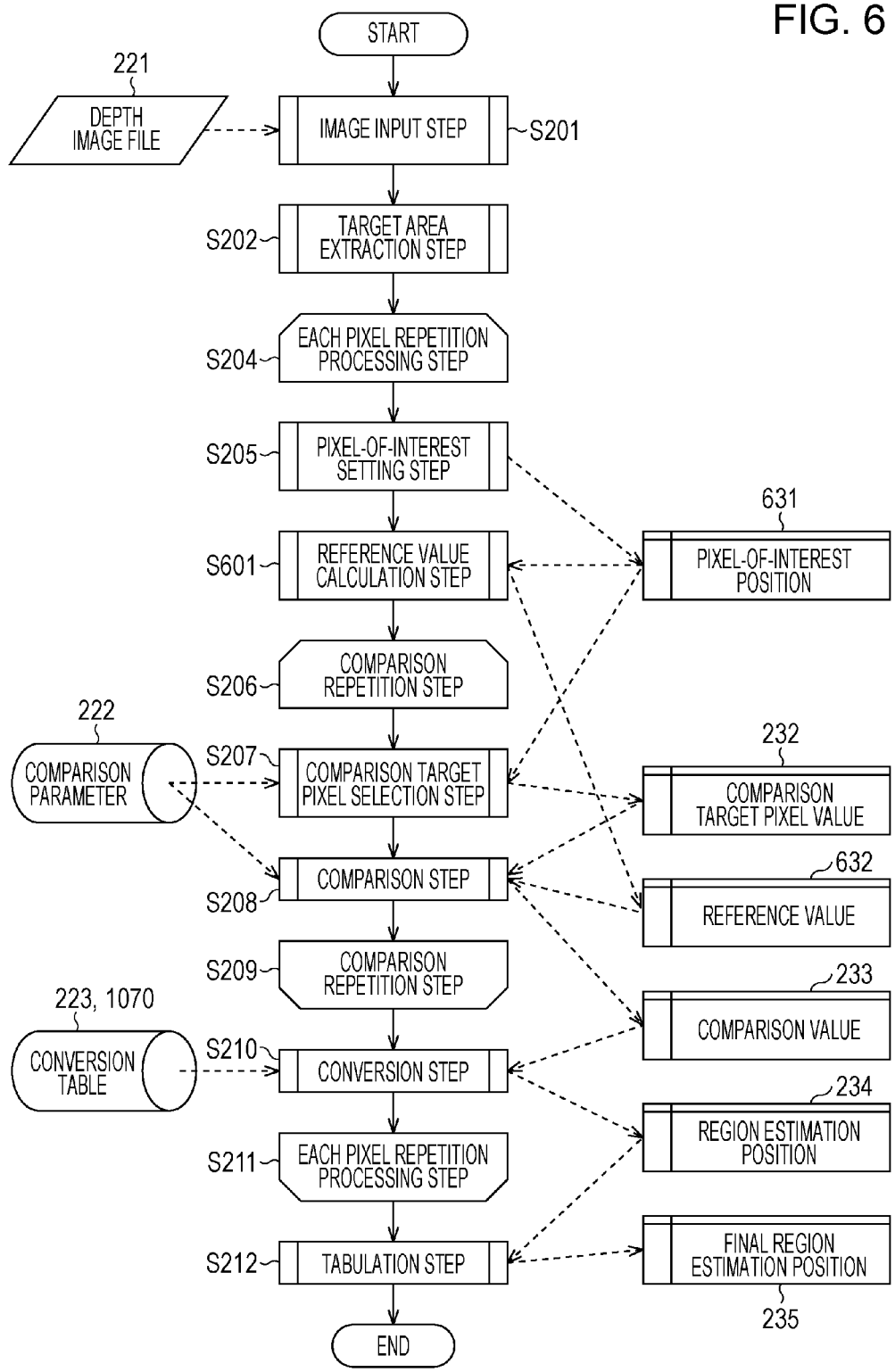
FIG. 6 is a flow chart illustrating an example of the processing procedure of the image processing method by the image processing apparatus according to the third exemplary embodiment of the present invention.

FIG. 6 is a flow chart illustrating an example of the processing procedure of the image processing method by the image processing apparatus according to the third exemplary embodiment of the present invention. Herein, FIG. 6 illustrates processing in a case where the orientation of the person is estimated. In FIG. 6, processing steps and information similar to those of the image processing method by the image processing apparatus according to the first exemplary embodiment illustrated in FIG. 2 are assigned with the same reference numerals, and descriptions thereof will be omitted, so that descriptions will be only given of parts different from FIG. 2.

In step S205 in FIG. 6, the pixel-of-interest setting unit 1030 in FIG. 1 sequentially selects a certain pixel from the depth image of the human body area part similarly as in the first exemplary embodiment to be sequentially selected as the pixel-of-interest. The pixel-of-interest setting unit 1030 in FIG. 1 then transmits a pixel-of-interest position 631 indicating a position of the set pixel-of-interest to not only the comparison target pixel selection unit 1040 used in the processing in step S207 but also the reference value calculation unit 1050 used in the processing in step S601. The pixel-of-interest setting unit 1031 of the learning unit 1001 also performs the processing similar to the above-described processing by the pixel-of-interest setting unit 1030.

Subsequently, in step S601 in FIG. 6, the reference value calculation unit 1050 in FIG. 1 calculates a reference value 632 from the depth image of the human body area part. As being different from the above-described first and second exemplary embodiments, according to the present exemplary embodiment, the reference value calculation unit 1050 in FIG. 1 calculates the different reference value 632 for each pixel-of-interest position 631. For that reason, as being different from the case of the above-described first and second exemplary embodiments, the calculation for the reference value is performed every time after the pixel-of-interest is set.

For example, the reference value calculation unit 1050 in FIG. 1 constructs a circular area 422 having a radius r where the pixel-of-interest 421 is set as illustrated in FIG. 4C. The reference value calculation unit 1050 in FIG. 1 then uses an average value calculated from the pixel values (depth values) of the human body area part included in the circular area 422 as the reference value 632. In the case of the example illustrated in FIG. 4C, a value calculated on the basis of the pixel values of all the pixels included in the partial area that is an area included in the human body area and constituted for each pixel-of-interest or the pixel values of the plurality of pixels included in this partial area can be used as the reference value 632. Herein, an arbitrary value may be used as the radius r. For example, a value in a certain range may be randomly set. It is however noted that the configuration becomes similar to the above-described first exemplary embodiment in a case where the radius r is a size large enough to include the entire human body area. Furthermore, a method of determining the radius r by using an evaluation index which will be described below in the fourth exemplary embodiment is also conceivable.

Similarly as in the above-described first and second exemplary embodiments, the reference value 632 may be any value as long as the value functions as the reference calculated from the pixel value of the pixel in the human body area part and is not limited to the average value. In addition, although FIG. 4C illustrates the example in which the circular area is constructed, but the shape of the constructed area is not limited to a circle. The reference value 632 is varied among the images and plays the role of the correction among the images. Furthermore, according to the present exemplary embodiment, the reference value 632 is different for each pixel-of-interest. As compared with the case where several types of the reference values are prepared for one image, the number of reference values becomes the number of pixels-of-interest. Thus, it is possible to realize the correction of the pixel values (depth values) in the respective pixels, and accordingly, it is possible to expect the accuracy improvement in the local part.

The reference value calculation unit 1050 in FIG. 1 then transmits the calculated reference value 632 to the comparison unit 1060. The reference value calculation unit 1051 of the learning unit 1001 in FIG. 1 also performs the processing similar to that by the reference value calculation unit 1050 described above.

The following processing in step S206 and subsequent steps in FIG. 6 is similar to the processing illustrated in FIG. 2.

Fourth Exemplary Embodiment

Next, a fourth exemplary embodiment of the present invention will be described.

According to the present exemplary embodiment, as being different from the above-described first to third exemplary embodiments, a case where a plurality of reference values are calculated, and one reference value is selected and used from among the plurality of reference values will be described. Specifically, in the example in which the orientation of the person is estimated similarly as in the first exemplary embodiment, the reference value is selected and used each time the comparison step is performed.

A schematic configuration of the image processing apparatus according to the fourth exemplary embodiment is similar to the schematic configuration of the image processing apparatus 1000 according to the first exemplary embodiment illustrated in FIG. 1.

In addition, processing at the time of the orientation estimation of the person will be described below by using FIG. 7, and processing at the time of the learning will be described below by using FIG. 8 mainly with regard to the difference from the above-described first to third exemplary embodiments.

Detail of the Processing

First, the processing at the time of the orientation estimation of the person will be described.

Figure 7:
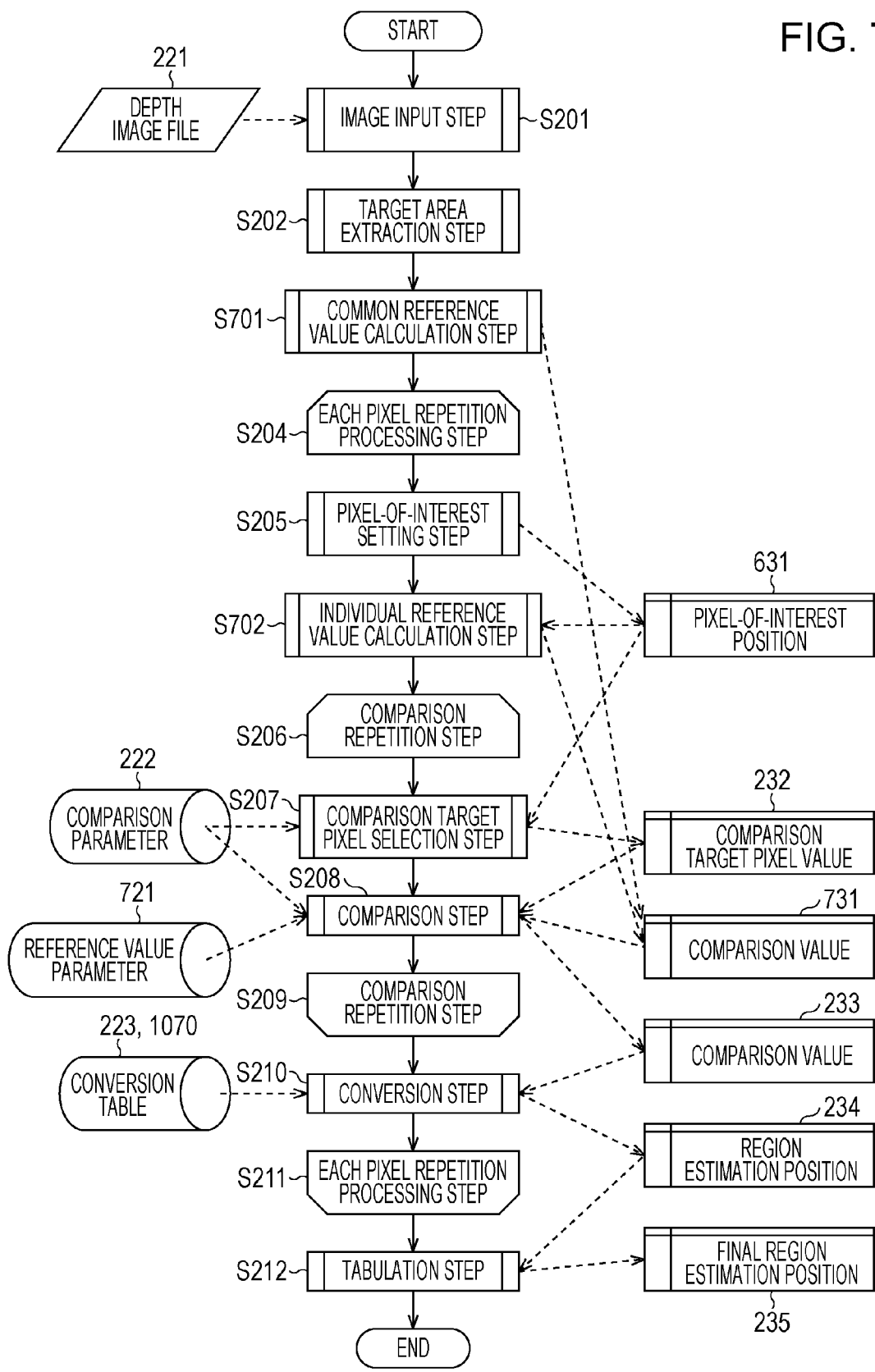
FIG. 7 is a flow chart illustrating an example of the processing procedure of the image processing method by the image processing apparatus according to a fourth exemplary embodiment of the present invention.

FIG. 7 is a flow chart illustrating an example of the processing procedure of the image processing method by the image processing apparatus according to the fourth exemplary embodiment of the present invention. Herein, FIG. 7 illustrates the processing in a case where the orientation of the person is estimated. In FIG. 7, processing steps and information similar to those of the image processing method by the image processing apparatus according to the first and third exemplary embodiments illustrated in FIG. 2 and FIG. 6 are assigned with the same reference numerals, and descriptions thereof will be omitted, so that descriptions will be only given of parts different from FIG. 2 and FIG. 6.

A common reference value calculation step in step S701 in FIG. 7 is equivalent to the step of calculating the average value of the entire human body area described in the first exemplary embodiment or the average value of the partial area in the human body area described in the second exemplary embodiment as the reference value.

An individual reference value calculation step in step S702 in FIG. 7 is equivalent to the step of calculating the average value of the partial area in the human body area set for each pixel-of-interest described in the third exemplary embodiment as the reference value.

In this manner, according to the present exemplary embodiment, the reference value calculation unit 1050 in FIG. 1 is configured to calculate a plurality of reference values.

In step S208 in FIG. 7, the comparison unit 1060 in FIG. 1 selects one reference value from among the plurality of reference values and performs a comparison with the comparison target pixel value 232 by using this selected one reference value 731. In the case of the present exemplary embodiment, each time the processing is repeated in the comparison repetition steps S206 to S209, the selection as to which reference value is used is performed again. At this time, the reference value determined at the time of the learning is used for selecting which reference value from among the plurality of reference values. This reference value determined at the time of the learning can be obtained by referring to a reference value parameter 721.

The following processing in step S210 and subsequent steps in FIG. 7 is similar to the processing illustrated in FIG. 2.

Next, the processing at the time of the learning will be described.

Figure 8:
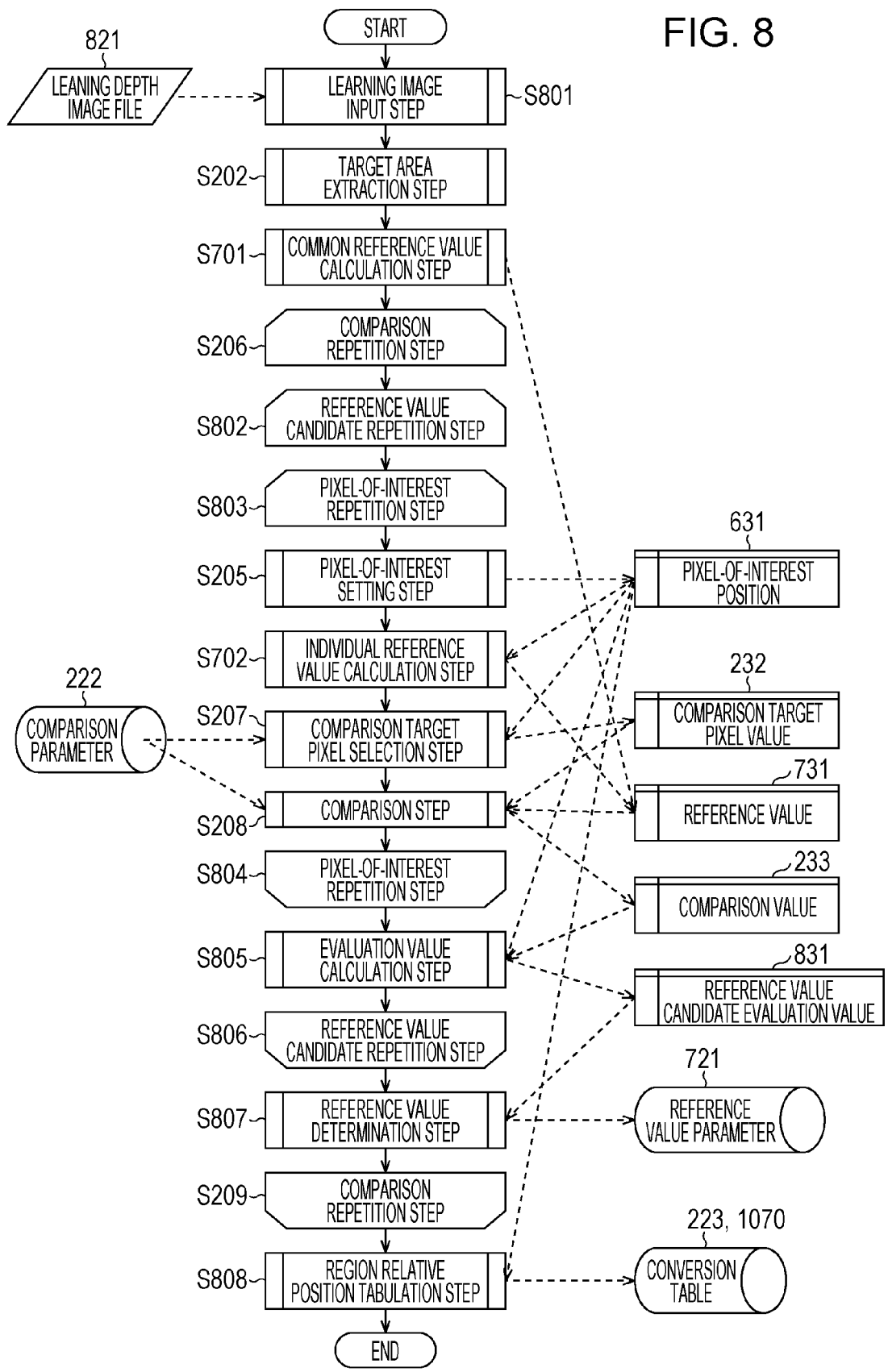
FIG. 8 is a flow chart illustrating an example of a processing procedure at the time of learning which is the processing procedure of the image processing method by the image processing apparatus according to the fourth exemplary embodiment of the present invention.

FIG. 8 is a flow chart illustrating an example of a processing procedure at the time of the learning which is the processing procedure of the image processing method by the image processing apparatus according to the fourth exemplary embodiment of the present invention. In FIG. 8, processing steps and information similar to those of the flow charts illustrated in FIG. 2, FIG. 6, and FIG. 7 are assigned with the same reference numerals, and descriptions thereof will be omitted, so that descriptions will be only given of parts different from FIG. 2, FIG. 6, and FIG. 7.

In step S801 in FIG. 8, the learning image input unit 1011 of the learning unit 1001 performs an input of the learning depth image as a learning image. Herein, the learning image is input by reading a learning depth image file 821. At the time of the learning according to the above-described first to third exemplary embodiments, both configurations can be adopted in which one image each is processed from the learning image input unit 1011 to the comparison unit 1061 and in which all the images are read and then collectively processed. In contrast to this, according to the present exemplary embodiment, the learning depth image files 821 need to be read as in the latter configuration.

As a method of determining the reference value, a method of determining the value by performing an evaluation using the evaluation value is conceivable. It is noted that the method of determining the comparison parameter of the comparison target pixel selection unit 1041 in FIG. 1 and the method of determining the threshold of the comparison unit 1061 can also be determined by the similar method.

When the orientation estimation of the person is performed, if parameters with which the respective regions, the differences in the positions, and the like can be more clearly checked, that is, the reference value, the layout, and the threshold exist, such parameters are preferably selected. For example, the comparison processing is performed by a combination of plural types of the reference values, the layouts, and the thresholds at the time of the learning. This processing is equivalent to the reference value candidate repetition steps S802 to S806 in FIG. 8.

Subsequently, in step S805 in FIG. 8, the evaluation value calculation unit 1062 in FIG. 1 performs the evaluation with respect to the respective combinations for each comparison value 233 corresponding to the comparison result of all the used pixels on how a separability of the pixel included in the comparison value (pixel corresponding to this comparison value) is satisfactory to calculate an evaluation value 831 of the reference value candidate. That is, the evaluation value calculation unit 1062 in FIG. 1 calculates the evaluation value 831 of the reference value candidate functioning as an index of the evaluation with regard to the satisfactory pixel separability for each comparison value 233 obtained as a result of the comparison by the comparison unit 1061 each time the pixel-of-interest is set by the pixel-of-interest setting unit 1031. That is, the evaluation value 831 of the reference value candidate is calculated one each with respect to the respective combinations. The pixel-of-interest repetition processing described herein is equivalent to the processing in the pixel-of-interest repetition steps S803 and S804.

Subsequently, in step S807 in FIG. 8, the reference value determination unit 1063 in FIG. 1 determines the reference value (furthermore, the layout and the threshold) having a most satisfactory separability among all the combinations on the basis of the evaluation value 831 of the reference value candidate calculated in step S805. The reference value determination unit 1063 in FIG. 1 then saves the determined reference value (furthermore, the layout and the threshold) as the reference value parameter 721. It is noted that, as the separability described herein, a cohesiveness for each region, a size of the difference between the regions, and the like are conceivable. For example, the separability can be evaluated by using an entropy. When a certain probability in the respective regions is set as p(i), and the number of regions is set as n, the entropy can be obtained by the following Expression (10).

$$H = -\sum_{i=1}^{n} p_i \log(p_i) \qquad (10)$$

When a certain region is uniquely determined by p(i)=1, the entropy becomes lowest, that is 0. By selecting a combination at which Expression (10) becomes the lowest among the combinations of the plural types of the reference values, the layouts, and the thresholds, it is possible to select a combination having a satisfactory separability.

In a case where a positional separability is desired to be evaluated, a dispersion can also be used for the evaluation. By selecting a combination where the dispersion is decreased in each cluster from among the combinations of plural types of the reference values, the layouts, and the thresholds, it is possible to select the combination where the cluster is satisfactorily cohesive. Furthermore, by taking the dispersions between the respective clusters into account, a combination where the dispersions in the respective clusters are large may be selected in addition to the combination where the dispersion in each cluster is small, for example.

It is noted that the evaluation on the separability is not limited to the method described herein. The parameter is also not limited to the parameter described herein. In addition, several types are prepared for the partial area described in the second exemplary embodiment to realize a parameterization, or the size or the shape of the reference value calculation area described in the third exemplary embodiment may also be parameterized.

In addition to the above, it is also possible to adopt a method of randomly selecting the reference value described in the first exemplary embodiment, a method of determining the reference value in a fixed order, and the like as the method of simply selecting the reference value. The selection method is not particularly limited. Herein, the case where the average value is used as the reference value has been described as an example, but the reference value is not particularly limited to the average value as described in the first to third exemplary embodiments.

In addition, as described in the first exemplary embodiment, in step S808 in FIG. 8, the creation of the conversion table 1070 is performed in the region relative position tabulation processing by the region relative position tabulation unit 1064 in FIG. 1. At this time, the region relative position tabulation unit 1064 in FIG. 1 obtains information of the belonging pixel for each comparison value 233 when the reference value parameter 721 determined in the processing so far is used and creates the conversion table 1070.

When the processing in step S808 is ended, the processing of the flow chart in FIG. 8 is ended.

Other Embodiments

The present invention can also be realized while the following processing is executed.

That is, the processing is executed while software (program) that realizes the functions of the above-described exemplary embodiments is supplied to a system or an apparatus via a network or various storage media, and a computer (or a CPU, an MPU, or the like) of the system or the apparatus reads out and executes the program.

This program and a computer-readable storage medium that stores the program are included in the present invention.

It is noted that any of the above-described exemplary embodiments of the present invention are merely specific examples for carrying out the present invention, and the technical range of the present invention should not be construed to be limited by these. That is, the present invention can be carried out in various forms without departing from its technical idea or its main characteristics.

The exemplary embodiments of the present invention can be used when the characteristic amount is extracted from the image for the identification, and can be utilized, for example, for the usages for the orientation estimation of the person, the object detection, the object recognition, and the like.

According to the exemplary embodiments of the present invention, it is possible to suppress the accuracy degradation in the image processing even in the image containing the noise.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-114401, filed Jun. 2, 2014, which is hereby incorporated by reference herein in its entirety.

What is claimed is:

1. An image processing apparatus comprising:
   at least one processor and memory coupled to each other and cooperating to act as:
   an extraction unit configured to extract a target area from an image,
   a setting unit configured to set a pixel from the target area as a pixel-of-interest,
   a reference value calculation unit configured to calculate a reference value based on pixel values of a plurality of pixels included in the target area,
   a comparison unit configured to perform processing of comparing each of pixel values of a plurality of pixels in a predetermined layout with respect to the pixel-of-interest with the reference value, using a conditional expression including the each of the pixel values of the plurality of pixels in the predetermined layout with respect to the pixel-of-interest and the reference value, and
   an information determination unit configured to determine information of the pixel-of-interest based on a plurality of comparison results obtained by the comparison unit repeatedly performing the comparison processing on the plurality of pixels in the predetermined layout with respect to the pixel-of-interest while changing a pixel to be processed each time the comparison processing is performed, and a values corresponding to the plurality of comparison results.

2. The image processing apparatus according to claim 1, wherein the comparison unit repeatedly performs processing of comparing pixel values of the plurality of pixels in the predetermined layout with respect to the pixel-of-interest with the reference value.

3. The image processing apparatus according to claim 1, wherein the reference value is a value calculated based on a pixel value of at least one or more pixels included in one partial area among a plurality of partial areas obtained by dividing the target area.

4. The image processing apparatus according to claim 1, wherein the reference value is a value calculated based on a pixel value of at least one or more pixels included in a partial area that is included in the target area and set for each of the pixels-of-interest.

5. The image processing apparatus according to claim 1, wherein the reference value calculation unit calculates a plurality of reference values, and wherein the comparison unit selects and uses one reference value from among the plurality of reference values.

6. The image processing apparatus according to claim 5, wherein the at least one processor and memory further cooperate to act as:
   an evaluation value calculation unit configured to calculate an evaluation value related to a separability of the pixels-of-interest for each comparison value calculated by the comparison unit with respect to the plurality of different pixels-of-interest set by the setting unit, and
   a reference value determination unit configured to determine the reference value based on the evaluation value calculated by the evaluation value calculation unit.

7. The image processing apparatus according to claim 1, wherein the information determination unit determines the information of the pixel-of-interest based on a table in which the comparison result of the comparison unit and the value corresponding to the comparison result are associated with each other.

8. The image processing apparatus according to claim 7, wherein the table is a table learnt from a comparison result of the comparison unit with respect to a learning image and information of the pixel-of-interest in the learning image.

9. The image processing apparatus according to claim 1, wherein the plurality of pixels in the predetermined layout with respect to the pixel-of-interest is randomly determined from a predetermined range that includes the pixel-of-interest.

10. The image processing apparatus according to claim 1, wherein the plurality of pixels in the predetermined layout with respect to the pixel-of-interest are determined by weighting a plurality of pixels included in a predetermined range that includes the pixel-of-interest.

11. An image processing method for an image processing apparatus, the image processing method comprising:

extracting a target area from an image;

setting a pixel from the target area as a pixel-of-interest;

calculating a reference value based on pixel values of a plurality of pixels included in the target area;

performing processing of comparing each of pixel values of a plurality of pixels in a predetermined layout with respect to the pixel-of-interest with the reference value, using a conditional expression including the each of the pixel values of the plurality of pixels in the predetermined layout with respect to the pixel-of-interest and the reference value; and determining information of the pixel-of-interest based on a plurality of comparison results obtained by repeatedly performing the comparison processing on the plurality of pixels in the predetermined layout with respect to the pixel-of-interest while changing a pixel to be processed each time the comparison processing is performed, and values corresponding to the plurality of comparison results.

12. A non-transitory computer readable storage medium storing a program to cause an image processing apparatus to perform an image processing method, the image processing method comprising:

extracting a target area from an image;

setting a pixel from the target area as a pixel-of-interest;

calculating a reference value based on pixel values of a plurality of pixels included in the target area;

performing processing of comparing each of pixel values of a plurality of pixels in a predetermined layout with respect to the pixel-of-interest with the reference value, using a conditional expression including the each of the pixel values of the plurality of pixels in the predetermined layout with respect to the pixel-of-interest and the reference value; and determining information of the pixel-of-interest based on a plurality of comparison results obtained by repeatedly performing the comparison processing on the plurality of pixels in the predetermined layout with respect to the pixel-of-interest while changing a pixel to be processed each time the comparison processing is performed, and values corresponding to the plurality of comparison results.

\* \* \* \* \*